(12) United States Patent
Duong et al.

(10) Patent No.: US 10,264,648 B2
(45) Date of Patent: Apr. 16, 2019

(54) SYSTEMS AND METHODS FOR A PARALLELED HYBRID HORTICULTURE SYSTEM

(71) Applicant: Fluence Bioengineering, Austin, TX (US)

(72) Inventors: Dung Duong, Austin, TX (US); Randy Johnson, Austin, TX (US)

(73) Assignee: Fluence Bioengineering, Inc., Austin, TX (US)

( * ) Notice: Subject to any disclaimer, the term of this patent is extended or adjusted under 35 U.S.C. 154(b) by 2 days.

(21) Appl. No.: 15/692,540

(22) Filed: Aug. 31, 2017

(65) Prior Publication Data

US 2018/0359834 A1    Dec. 13, 2018

Related U.S. Application Data

(60) Provisional application No. 62/516,462, filed on Jun. 7, 2017.

(51) Int. Cl.
*H05B 33/08* (2006.01)
*A01G 7/04* (2006.01)
*A01G 22/00* (2018.01)

(52) U.S. Cl.
CPC ........ *H05B 33/0887* (2013.01); *A01G 7/045* (2013.01); *A01G 22/00* (2018.02); *H05B 33/0827* (2013.01)

(58) Field of Classification Search
None
See application file for complete search history.

(56) References Cited

U.S. PATENT DOCUMENTS

2011/0204821 A1    8/2011   Holmes et al.
2013/0057165 A1*   3/2013   Ide ................... H05B 33/0845
                                                       315/186
2013/0328532 A1   12/2013   Ting

FOREIGN PATENT DOCUMENTS

TW            201004472         1/2010

* cited by examiner

*Primary Examiner* — Douglas W Owens
*Assistant Examiner* — Jianzi Chen
(74) *Attorney, Agent, or Firm* — Yutian Ling

(57) ABSTRACT

Examples of the present disclosure are related to systems and methods for a paralleled hybrid horticulture system. More particularly, embodiments disclose utilizing a constant power (CP) power supply that is configured to operate in both constant voltage and constant current modes, wherein the maximum current and maximum voltage conditions may be programed.

13 Claims, 9 Drawing Sheets

SYSTEMS AND METHODS FOR A PARALLELED HYBRID HORTICULTURE SYSTEM

CROSS-REFERENCE TO RELATED APPLICATIONS

This application claims a benefit of priority under 35 U.S.C. § 119 to Provisional Application No. 62/516,462 filed on Jun. 7, 2017, which is fully incorporated herein by reference in their entirety.

BACKGROUND INFORMATION

Field of the Disclosure

Examples of the present disclosure are related to systems and methods for a paralleled hybrid horticulture system. More particularly, embodiments disclose utilizing a constant power (CP) power supply that is configured to operate in a constant voltage or constant current mode, wherein the maximum current and maximum voltage conditions may be programed based on the characteristics of a LED bar.

Background

Conventional LEDs emit light through the conversion of electrons to photons. As the rate of electrons (current) increases, the number of emitted photons (radiometric flux) proportionally increases. Since LEDs are not 100% efficient (electron to photon conversion), heat proportionally increases as a function of current. At extreme currents, quantum wells associated with the LEDs can get saturated, and therefore higher current leads to less light output. IV curves for LEDs allow for a direct correlation between the voltage and the current through the LEDs. Based on the IV curves, LEDs are sensitive to overvoltage conditions. In an overvoltage condition, the voltage in a circuit is raised above its upper design limit.

Since voltage is a function of current, a voltage rise above the design limits in-turn pushes current through the LEDs above the design limits. Considerable damage can be caused to electrical devices by the voltage surge creating over voltage conditions than that for which the devices are rated for. For example, when overvoltage/current occurs, an LED may stop working due to breakage in the circuit (wirebond breaking, traces burn up) and overheating (material property changes as a function of heat).

Conventionally light fixtures include a plurality of LED strings that are coupled in parallel with a constant current (CC) power supply. Utilizing the CC power supply, current is evenly distributed to each of the LED strings based on the forward voltage of the LED strings. Because the forward voltages of the LED strings are consistent, the currents applied to each LED string are consistent.

However, if a number of LED strings coupled to the CC power supply drops below a given threshold, such as a single LED string, then all of the current from the CC power supply passes through the single LED string. This causes the single LED string to be overdriven, overheat, and prematurely fail.

Accordingly, needs exist for more effective and efficient systems and methods for paralleled hybrid horticulture systems, which utilize constant current and/or constant power supplies.

SUMMARY

Examples of the present disclosure are related to systems and methods for a paralleled hybrid horticulture system. More particularly, embodiments disclose utilizing a constant power (CP) power supply that is configured to operate in both a constant voltage mode or a constant current mode, wherein the maximum current and maximum voltage conditions may be programed based on the forward voltage of the LED strings. In embodiments, a constant current set point and a constant voltage set point may be respectfully determined based on the forward voltage and forward current across each the LEDs strings.

A first embodiment may include a constant voltage power supply coupled to a plurality of LED circuits positioned in parallel. The LED circuits may include a plurality of LEDs and constant current (CC) drivers in series. Responsive to a number of LED circuits positioned in parallel increasing or decreasing, the constant current driver may maintain a constant current applied the corresponding LED circuits.

A second embodiment may include a constant voltage power supply coupled to a plurality of LED circuits positioned in parallel. The LED circuits may include a resistor and a an LED strings positioned in series, wherein a plurality of LED circuits are positioned in parallel with each other. The resistor within a LED circuit may be configured to limit the current applied to a corresponding LED circuit. In embodiments, the size of the resistor controls the current passing through the plurality of LEDs in series. In embodiments, each resistor in the LED circuits may be of the same and/or similar size.

A third embodiment may include a constant power supply being coupled to a plurality of LED strings. The constant power supply may be configured to operate primarily in a constant current (CC) mode and switch to constant voltage (CV) mode when in over-voltage protection. In this embodiment, the forward voltage of an LED string may be configured to be lower than the maximum designed output forward voltage, and the constant power supply may initially operate in constant current mode. Responsive to a number of LED strings lowering, current may pass through the LED string up until the over-voltage condition based on the output forward voltage of the LED string. When the over-voltage condition is met, the power supply may not allow additional current to flow through the LED string, and the power supply may switch to a constant voltage mode. Because the IV curves of the LED strings are consistent, the over-current limit to the LED strings may be tailored based on the characteristics of the LED strings.

Embodiments may be configured to simplify construction of LED bars by having fewer components, higher reliability due to a lower number of connections between components and fewer components that could fail. Additionally, costs associated with labor, development, materials, and quality control may be reduced.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
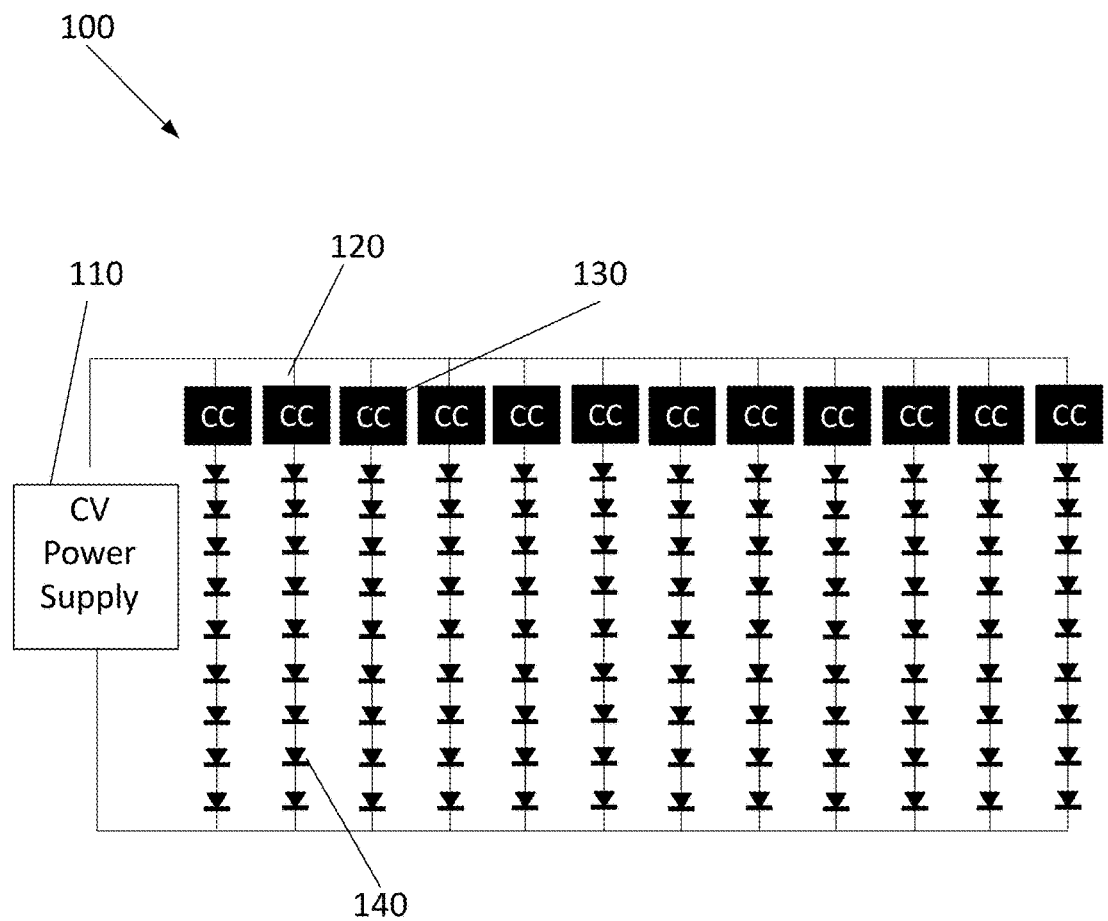
FIG. 1 depicts a paralleled hybrid power horticulture system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts a paralleled hybrid power horticulture system 100, according to an embodiment. As depicted in FIG. 1, horticulture system 100 may include a CV power supply 110 and LED circuits 120, which include a CC driver 130 and LEDs 140.

CV power supply 110 may be a power supply that is configured to output a fixed and/or constant voltage. CV power supply 110 may be configured to have a varying current based on a load caused by LEDs 140 and LED circuits 120. The fixed voltage associated with CV power supply 110 may be set based on the forward voltages and load created by LED circuits 120.

LED circuits 120 may be coupled in parallel to each other and to CV power supply 120. Each LED circuit 120 may include a corresponding CC driver 130 and a plurality of LEDs 140 positioned in series. The plurality of LEDs 140 may be the same and/or different LEDs.

CC driver 130 may be an electrical device that is configured to output a constant electric current. CC driver 130 may be configured to guard LEDs 140 against high current levels, which cause LEDs 140 to malfunction. The fixed current associated with CC driver 130 may be set based on the desired load of the LEDs circuit.

LEDs 140 may be light emitting diodes that emit light when activated. When a suitable voltage is applied to LEDs 140 electrons associated with LEDs release energy in the form of photons. Each of the LEDs 140 may have a forward voltage that is required for the LEDs to operate, and create a load for horticulture system 100.

Figure 2:
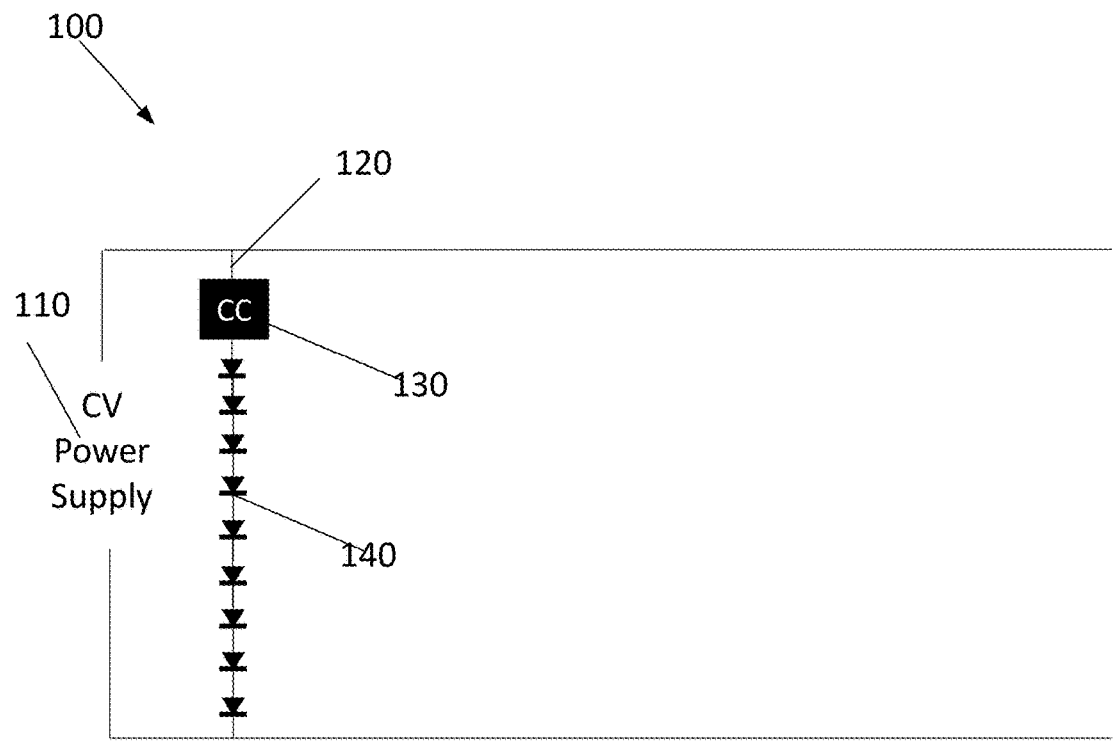
FIG. 2 depicts a horticulture system, according to an embodiment.

FIG. 2 depicts horticulture system 100, according to an embodiment. As depicted in FIG. 2, horticulture system 100 may have a number of LED circuits 120 (one) that is below a light string threshold. The number of LED circuits 120 may be decreased for various reasons, such as a malfunction of an LED circuit, removal of an LED circuit, etc. In embodiments with a CC driver, the current load pulled from CB power supply 110 may be based on what is needed by LEDs 140. CC driver 130 may be configured to protect the circuit, and will not allow for the LEDs 140 to be overdriver.

In embodiments, CV power supply 110 may be configured to apply a constant voltage to the single or remaining LED circuit(s) 120, while the CC driver 130 may be configured to drive the LEDs 140 at a constant current. Accordingly, LEDs 140 may not have a voltage that is higher than a power threshold to activate the LEDs 140, and may have always have a desired current that will not overdrive the LEDs 140.

Figure 3:
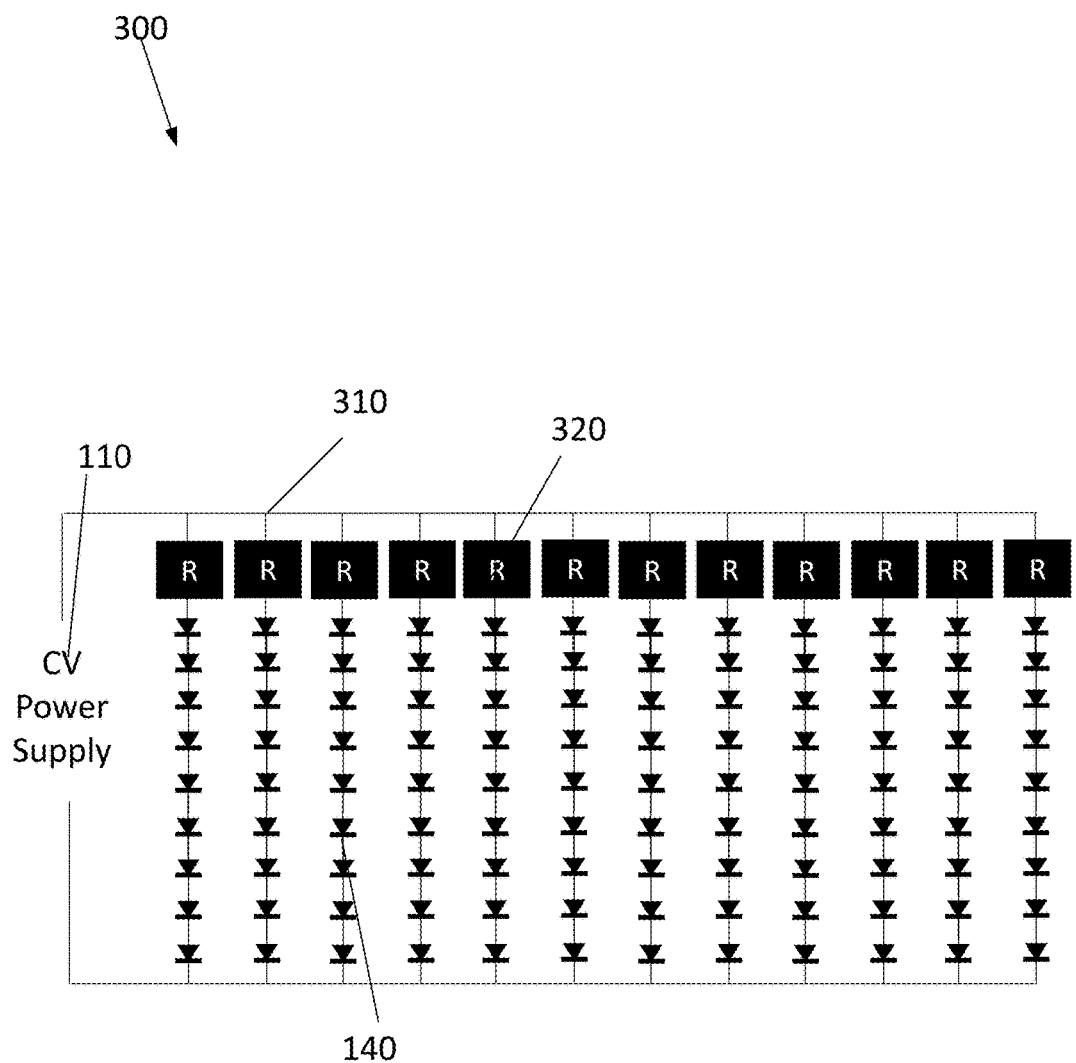
FIG. 3 depicts a horticulture system, according to an embodiment.

FIG. 3 depicts horticulture system 300, according to an embodiment. Certain elements depicted in system 300 may be described above. For the sake of brevity another description of these elements is omitted.

As depicted in FIG. 3, a plurality of LED circuits 310 may be positioned in parallel to each other. Each of the LED circuits 310 includes a resistor 320 and LED string 140. Resistors 320 may be configured to limit and control the current applied to each of the LED strings 140. As the number of LED circuits 310 increases or decreases, CV power supply 110 may dynamically change the current through system 300. In embodiments, the string voltage across each LED string 140 may be substantially matched to the fixed voltage supplied by CV power supply 110. Therefore, a size of resistor 320 may be kept relatively small, while having high efficiency.

Figure 4:
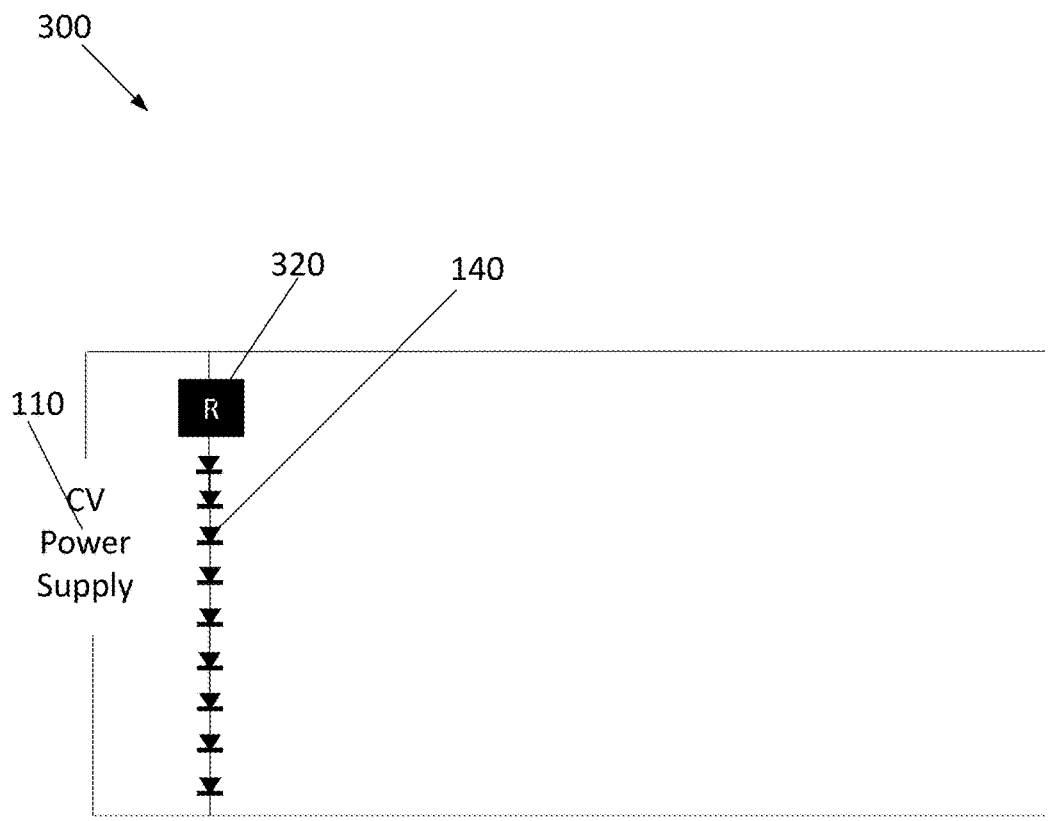
FIG. 4 depicts a horticulture system where the number of LED circuits is reduced below a threshold number, according to an embodiment.

As depicted in FIG. 4, the number of LED circuits 310 within horticulture system 300 may be reduced below a threshold number. However, resistor 320 may be configured to limit the current applied to the single LED circuit 310. In embodiments, resistor 320 may be set at a size where the remaining LED strings 140 may not be at an overdrive condition even when the number of LED circuits 310 within system 100 is below the threshold number.

Figure 5:
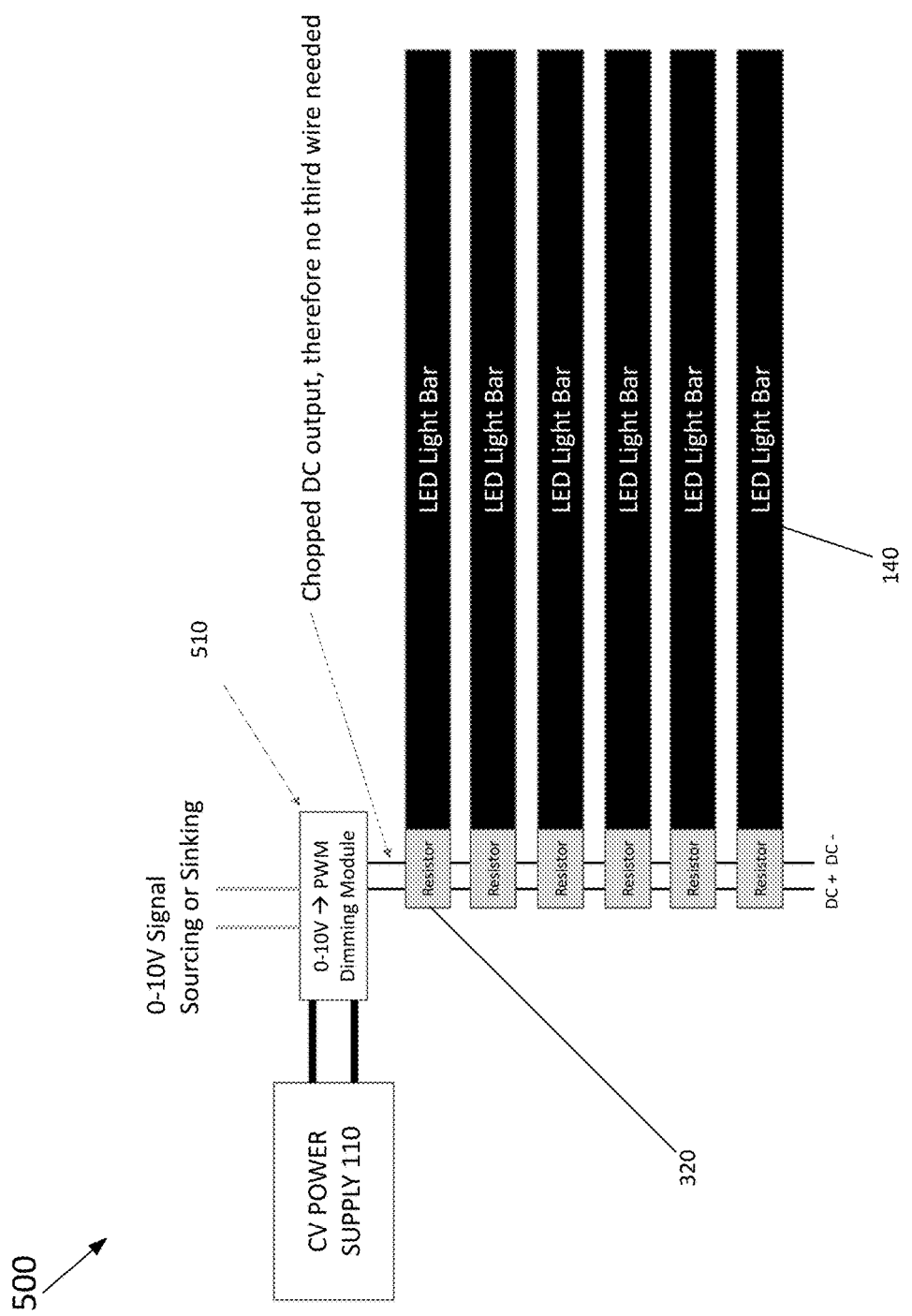
FIG. 5 depicts a horticulture system, according to an embodiment.

FIG. 5 depicts horticulture system 500, according to an embodiment. Certain elements depicted in system 500 may be described above. For the sake of brevity, another description of these items is omitted.

As depicted in FIG. 5, a pulse width modulator (PWM) 510 may be configured to be positioned between CV power supply 110 and resistors 320. PWM 510 may be configured to control and create square waves of a given frequency and duration. These waves may be utilized as a signal that can be switched off and on, or those that have a high and low signal. In embodiments, PWM 150 may vary the frequency and the duty cycle of the wave, wherein the frequency may be a faster period of time than the human eye is able to tell the difference, such as 2 milli-seconds. By altering the frequency of the signal and the time the signal is in the off and/or on position (duty cycle), LED strings 140 may appear to be dimmed through a chopping the voltage signal. This may be based on a ratio between the high and low signals when the LEDs are emitting light.

In embodiments, PWM 510 may be configured to limit the amount of time that CV power supply 110 applies the constant voltage to resistors 320. By controlling the length of time the LED strings 140 receive power, LED strings 140 may appear to be dimmed. For example, if the square wave is in the on position for fifty percent of the time and off position for fifty percent of the time, LED strings 140 may appear to be fifty percent dimmed. Alternatively, if the square wave in the on position for seventy percent of the time and off position for thirty percent of the time, LED strings 140 may appear to be 30 percent dimmed. To have the LED strings 140 be more or less dimmed, the ratio of the amount of time the wave supplied by the PWM 510 is in the off position or on position may be increased or decrease, respectively.

In embodiments, PWM 510 may be configured to operate with a constant power supply when the constant power supply is operating in constant voltage or constant current mode.

Figure 6:
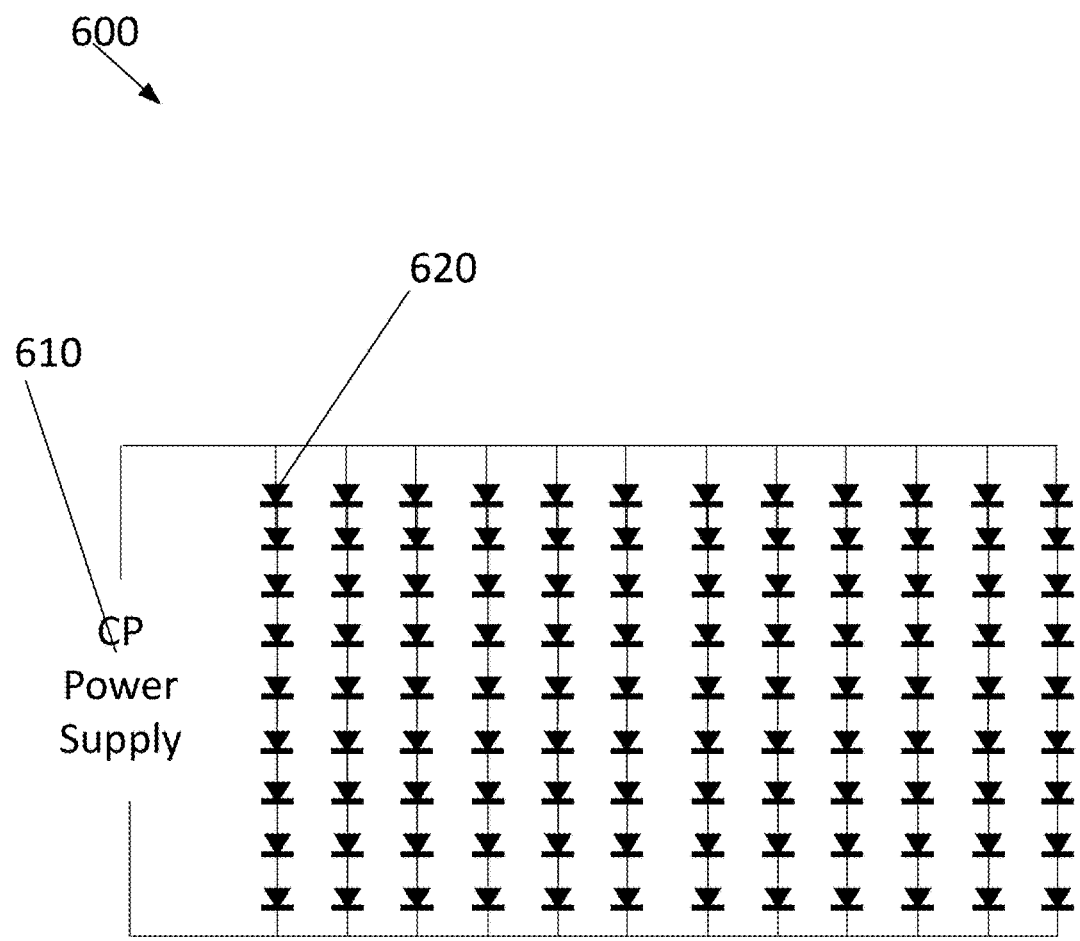
FIG. 6 depicts a horticulture system, according to an embodiment.

FIG. 6 depicts horticulture system 600, according to an embodiment. Certain elements depicted in system 600 may be described above. For the sake of brevity, another description of these elements is omitted. System 600 may include Constant Power (CP) power supply 610 and LED strings 620.

CP power supply 610 may be a power supply that is configured to operate in both constant voltage (CV) and constant current (CC) mode, wherein both the CV and CC modes have over-current and over-voltage protection. In embodiments, the forward voltage of CP power supply 610 may be slightly higher than that of an LED string 620, such that CP power supply 610 initially operates in CC mode.

Figure 7:
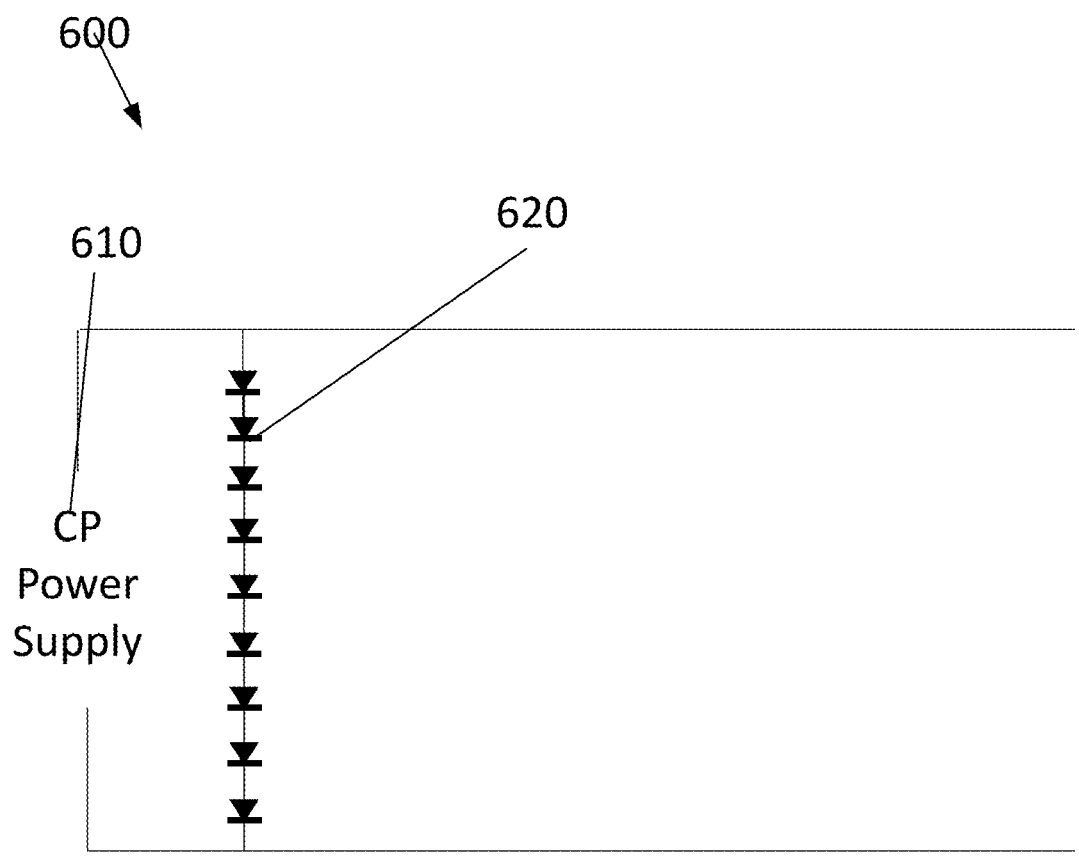
FIG. 7 depicts a horticulture system where the number of LED circuits is reduced below a threshold number, according to an embodiment.

As depicted in FIG. 7, the number of LED strings 620 within horticulture system 600 may be reduced below a threshold number. By changing the number of LED strings 620, the load to CP power supply 600 may dynamically change. Responsive to lowering the number of LED strings 620 within system 600, CP power supply 610 may supply power with a given current to the remaining LED strings 620 until LED string 620 is in an over-voltage condition. At this point, the power supply may not allow additional current to flow through the remaining LED string 620. Due to the increase in voltage supplied by CP power supply 610, CP power supply 610 may switch modes to a constant voltage mode.

While in the constant voltage mode, the supplied voltage from CP power supply 610 may be programed to an amount that is less than the overvoltage condition of the LED strings 620. However, because the load on system 100 is reduced when the number of LED strings 620 is below the threshold, the floating current supplied by CP power supply 610 in the constant voltage mode may remain lower than an over current condition.

Figure 8:
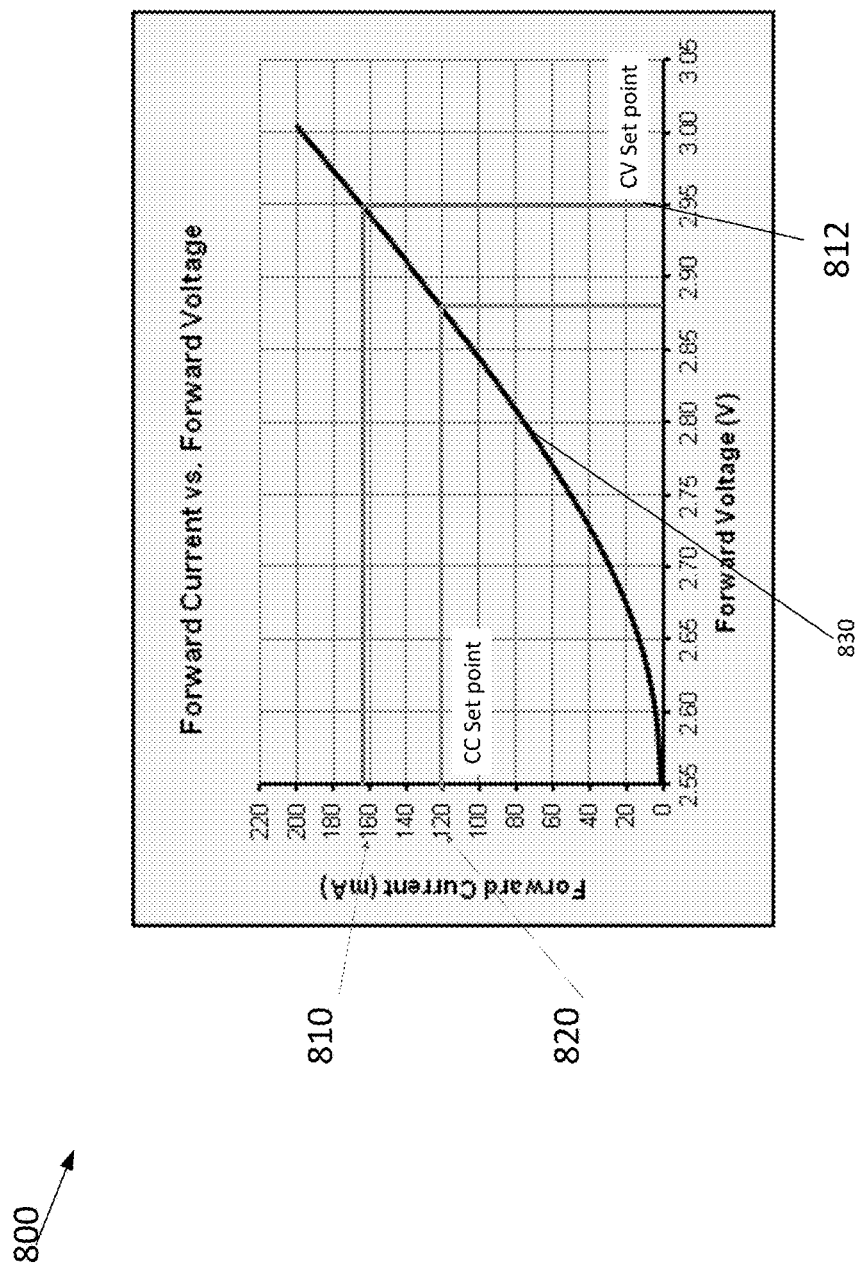
FIG. 8 depicts a graph plotting the maximum current set point based on the maximum voltage associated with a representative LED, according to an embodiment.

FIG. 8 depicts a graph 800 plotting the maximum current set point 810 based on the maximum voltage 812 associated with a representative LED. Strings of LEDs 620 in series would multiply the voltage by the number of LEDs. In embodiments, responsive to limiting the number of LED strings 620 in system 600 while CP power supply 610 provides a constant current, the voltage applied to the fewer number of LED strings 620 remaining in system 600 may increase. However, the increase in voltage may cease when if the remaining LED strings 620 are in an overvoltage condition, wherein CP power supply may change to be in a constant voltage mode.

Additionally, graph 800 depicts a constant current set point 820 adjustable by the maximum current output 810. The constant current set point 820 may be based on the maximum voltage 812 of the LED string 620, wherein the current associated with constant current set point 820 may be less than the current associated with the maximum current set point 810. By being able to program CP power supply 610 and set maximum current and maximum voltage conditions of LED strings 620 based on the characteristics 830 of LED strings, finer tuning of the drive current and maximum light bar current may be applied to system 600.

Figure 9:
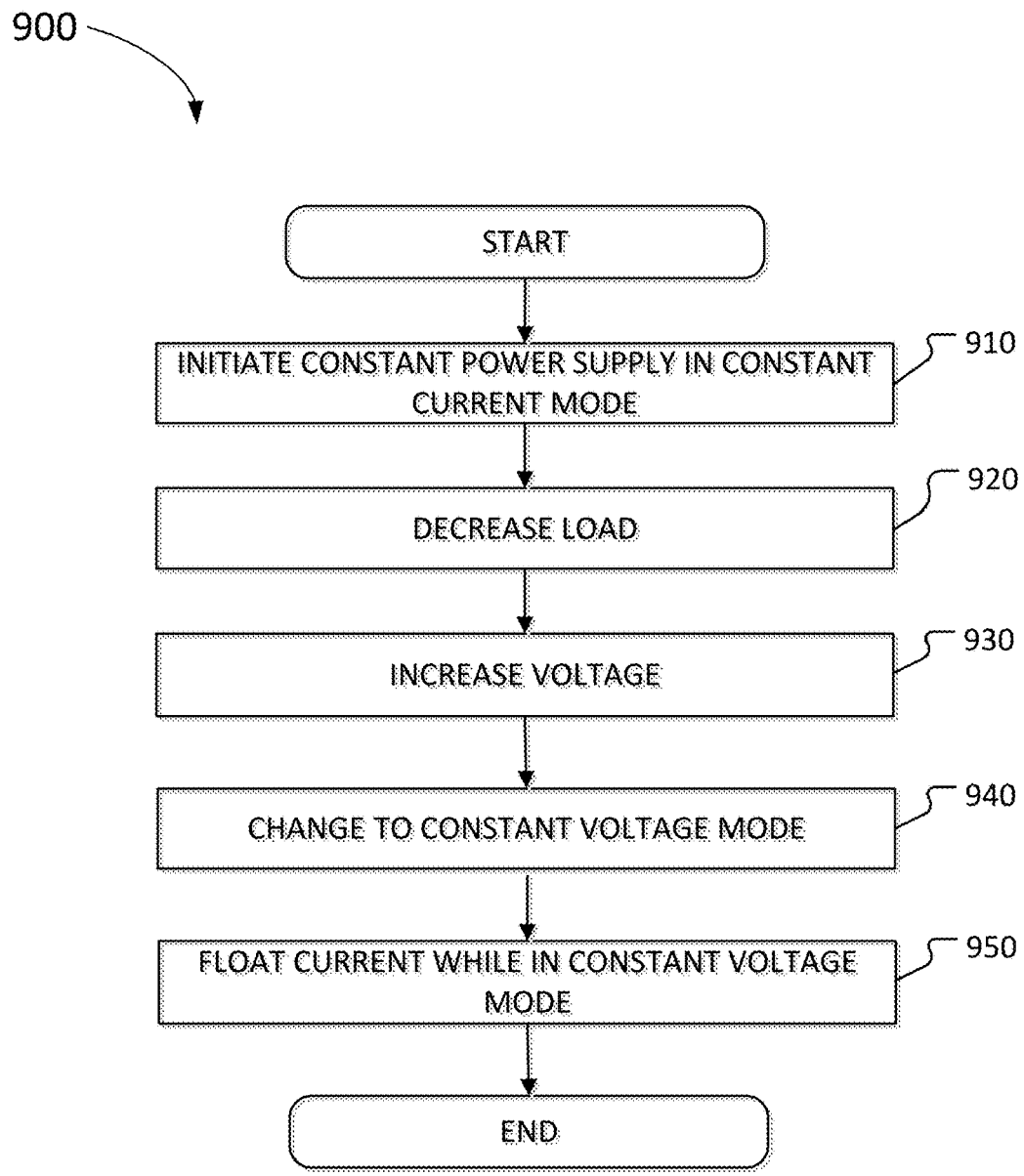
FIG. 9 illustrates a method for minimizing overdriven conditions using a constant power supply configured to operate in constant current or constant power mode, according to an embodiment, according to an embodiment.

FIG. 9 illustrates a method 900 for minimizing overdriven conditions using a constant power supply configured to operate in constant current or constant power mode, according to an embodiment. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting.

At operation 910, a constant power supply may be configured to operate in a constant current mode, wherein the constant power supplies at a dynamic voltage to a plurality of LED strings based on the loads of the plurality of LED strings.

At operation 920, the number of the LED strings may decrease, which may correspondingly change the load. This may cause the voltage supplied to the LED strings to increase.

At operation 930, the voltage supplied by the constant power supply may increase until reaching a preprogramed amount. The preprogramed amount may be based on an overvoltage condition of the LED strings.

At operation 940, responsive to the voltage being greater than or equal to the preprogramed mount, the constant power supply may dynamically and automatically change from a constant current mode to a constant voltage mode.

At operation 950, the constant power supply may supply voltages to the remaining LED strings that is less than the overvoltage condition of the LED strings by having a floating current. If the floating current associated with the constant power supply becomes higher than a preprogramed current amount, the constant power supply may dynamically revert to a constant current mode.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A hybrid horticulture system comprising:
a plurality of light emitting diode strings positioned in parallel to each other, wherein the plurality of light emitting diode strings include a plurality of light emitting diodes;
a constant power supply configured to operate in a constant voltage mode or a constant current mode at a given time period, wherein the constant power supply is configured to supply power to an input of the plurality of light emitting diode strings, the constant power supply has a predetermined set maximum voltage when the constant power supply is operating in constant current mode, the predetermined set maximum voltage being associated with an overvoltage condition of the plurality of light emitting diode strings, wherein the constant power supply is configured to switch from the constant current mode to the constant voltage mode responsive to a supply voltage from the constant power supply being greater than the predetermined set maximum voltage.

2. The hybrid horticulture system of claim 1, wherein the constant power supply is preprogramed to have a constant current set point, wherein a first current level associated with the constant current set point is less than a second current level associated with a maximum current set point.

3. The hybrid horticulture system of claim 2, wherein the maximum current set point is associated with the predetermined set maximum voltage.

4. The hybrid horticulture system of claim 2, wherein the constant power supply supplies current at the constant current set point in the constant current mode.

5. The system of claim 1, wherein the constant power supply is initially set to a constant current mode.

6. A method for hybrid horticulture system comprising:
positioning a plurality of light emitting diode strings in parallel to each other, wherein the plurality of light emitting diode strings include a plurality of light emitting diodes;
supplying power via a constant power supply to the plurality of light emitting diode strings; the constant power supply being configured to operate in a constant voltage mode or a constant current mode at a given time period;
setting a predetermined set maximum voltage for the constant power supply for when the constant power supply is operating in the constant current mode, the predetermined set maximum voltage being associated with an overvoltage condition of the plurality of light emitting diode strings,
switching the constant power supply from the constant current mode to the constant voltage mode responsive to a supply voltage from the constant power supply being greater than the predetermined set maximum voltage.

7. The method of claim 6, further comprising:
preprogramming the constant power supply to have a constant current set point, wherein a first current level associated with the constant current set point is less than a second current level associated with a maximum current set point.

8. The method of claim 7, wherein the maximum current set point is associated with the predetermined set maximum voltage.

9. The method of claim 7, wherein the constant power supply supplies current at the constant current set point in the constant current mode.

10. The method of claim 6, further comprising:
positioning a pulse width modulator between the constant power supply and the plurality of light bar strings, wherein the pulse width modulator is configured to operate when the constant power supply is operating in the constant voltage mode.

11. The method of claim 10, further comprising:
generating, via the pulse width modulator, square waves with a given frequencies and durations alternating between a high signal and low signal, wherein the frequency is faster than 2 milliseconds.

12. The method of claim 11, further comprising:
dimming the plurality of light emitting diodes within the plurality of light emitting diode strings based on a ratio between an amount of time between the high signal and the low signal.

13. The method of claim 6, further comprising:
initially setting the constant power supply to a constant current mode.

* * * * *